US011268709B1

(12) United States Patent
Zeeff

(10) Patent No.: US 11,268,709 B1
(45) Date of Patent: Mar. 8, 2022

(54) VIBRATION-DAMPENING SUPPORT FOR AN HVAC UNIT

(71) Applicant: James Zeeff, Palmyra, VA (US)

(72) Inventor: James Zeeff, Palmyra, VA (US)

( * ) Notice: Subject to any disclaimer, the term of this patent is extended or adjusted under 35 U.S.C. 154(b) by 0 days.

(21) Appl. No.: 16/922,000

(22) Filed: Jul. 7, 2020

(51) Int. Cl.
*F24F 1/40* (2011.01)
*F16F 15/067* (2006.01)
*F16F 1/06* (2006.01)
*F16M 7/00* (2006.01)

(52) U.S. Cl.
CPC .................. *F24F 1/40* (2013.01); *F16F 1/06* (2013.01); *F16F 15/067* (2013.01); *F16M 7/00* (2013.01); *F16M 2200/08* (2013.01)

(58) Field of Classification Search
CPC .. F24F 1/40; F16F 1/06; F16F 15/067; F16M 7/00; F16M 2200/08
USPC .............. 248/678, 676, 677, 346.01, 346.03, 248/346.04, 157, 188.1, 188.8, 615, 616, 248/622, 624
See application file for complete search history.

(56) References Cited

U.S. PATENT DOCUMENTS

| | | | | |
|---|---|---|---|---|
| 2,540,525 A * | 2/1951 | Howarth | ............... | F16F 15/067 248/578 |
| 2,553,269 A * | 5/1951 | Oldofredi | .................. | F16F 1/12 267/178 |
| 2,661,836 A * | 12/1953 | Jewell | .................... | B65D 19/44 206/320 |
| 3,814,357 A * | 6/1974 | Rontgen | .................. | F16F 1/128 248/573 |
| 4,722,505 A * | 2/1988 | Kaiser | .................... | G11B 33/08 248/561 |
| 5,306,121 A * | 4/1994 | Heflin | ................. | F04B 39/0044 248/638 |
| 5,839,295 A | 11/1998 | Lehmann | | |
| 6,336,794 B1 * | 1/2002 | Kim | ....................... | F04C 23/00 417/363 |
| 6,352,234 B1 * | 3/2002 | Liu | ...................... | A47D 13/043 188/5 |
| 6,648,295 B2 | 11/2003 | Herren | | |
| 6,726,158 B2 * | 4/2004 | Issa | ......................... | G05G 1/58 248/118.1 |
| 6,912,866 B2 | 7/2005 | Seo | | |
| D513,819 S | 1/2006 | Ji | | |

(Continued)

FOREIGN PATENT DOCUMENTS

WO     2012103171     8/2012

*Primary Examiner* — Eret C McNichols
*Assistant Examiner* — Michael McDuffie
(74) *Attorney, Agent, or Firm* — Kyle A. Fletcher, Esq.

(57) ABSTRACT

The vibration-dampening support for an HVAC unit is configured for use with heating, ventilation, and air conditioning (HVAC) equipment. The vibration-dampening support for an HVAC unit is a pedestal structure that forms a load path that transfers the load of the HVAC equipment to a supporting surface. The vibration-dampening support for an HVAC unit is an elastic structure. The elastic nature of the vibration-dampening support for an HVAC unit protects the HVAC equipment by absorbing vibrations generated by the HVAC equipment. The vibration-dampening support for an HVAC unit comprises a pedestal plate, a spring housing, a mounting tube, and a compression spring. The spring housing contains the compression spring. The pedestal plate and the mounting tube attach to the spring housing.

18 Claims, 5 Drawing Sheets

(56) References Cited

U.S. PATENT DOCUMENTS

| | | | |
|---|---|---|---|
| 7,300,032 B2 | 11/2007 | Williams | |
| 7,458,556 B1 * | 12/2008 | Manucy | F16F 15/085 248/676 |
| 7,478,790 B2 * | 1/2009 | Yun | F04B 39/0044 248/624 |
| 7,814,760 B2 | 10/2010 | Immel | |
| 8,833,511 B2 * | 9/2014 | Maruyama | F16F 1/128 181/207 |
| 8,991,780 B2 * | 3/2015 | Pedersen | B66C 1/10 248/562 |
| 9,933,183 B1 * | 4/2018 | Den Adel | F24F 13/32 |
| 9,939,042 B1 * | 4/2018 | Green | F16F 1/128 |
| 10,184,538 B2 * | 1/2019 | Bernert | F16L 3/2053 |
| 2005/0279895 A1 * | 12/2005 | Lee | F16F 15/067 248/188.8 |
| 2009/0212193 A1 * | 8/2009 | Neibert | A47B 91/16 248/615 |
| 2012/0193505 A1 | 8/2012 | Baron | |
| 2016/0379685 A1 * | 12/2016 | Lyu | G11B 33/128 248/346.03 |
| 2019/0142160 A1 * | 5/2019 | Hognaland | A47B 91/16 248/188.2 |

* cited by examiner

VIBRATION-DAMPENING SUPPORT FOR AN HVAC UNIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mechanical engineering and engineering elements, more specifically, a non-rotating device used to control the vibration of a rotating system.

SUMMARY OF INVENTION

The vibration-dampening support for an HVAC unit is configured for use with heating, ventilation, and air conditioning (HVAC) equipment. The vibration-dampening support for an HVAC unit is a pedestal structure that forms a load path that transfers the load of the HVAC equipment to a supporting surface. The vibration-dampening support for an HVAC unit is an elastic structure. The elastic nature of the vibration-dampening support for an HVAC unit protects the HVAC equipment by absorbing vibrations generated by the HVAC equipment. The vibration-dampening support for an HVAC unit comprises a pedestal plate, a spring housing, a mounting tube, and a compression spring. The spring housing contains the compression spring. The pedestal plate and the mounting tube attach to the spring housing.

These together with additional objects, features and advantages of the vibration-dampening support for an HVAC unit will be readily apparent to those of ordinary skill in the art upon reading the following detailed description of the presently preferred, but nonetheless illustrative, embodiments when taken in conjunction with the accompanying drawings.

In this respect, before explaining the current embodiments of the vibration-dampening support for an HVAC unit in detail, it is to be understood that the vibration-dampening support for an HVAC unit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vibration-dampening support for an HVAC unit.

It is therefore important that the claims be regarded as including such equivalent construction insofar as they do not depart from the spirit and scope of the vibration-dampening support for an HVAC unit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
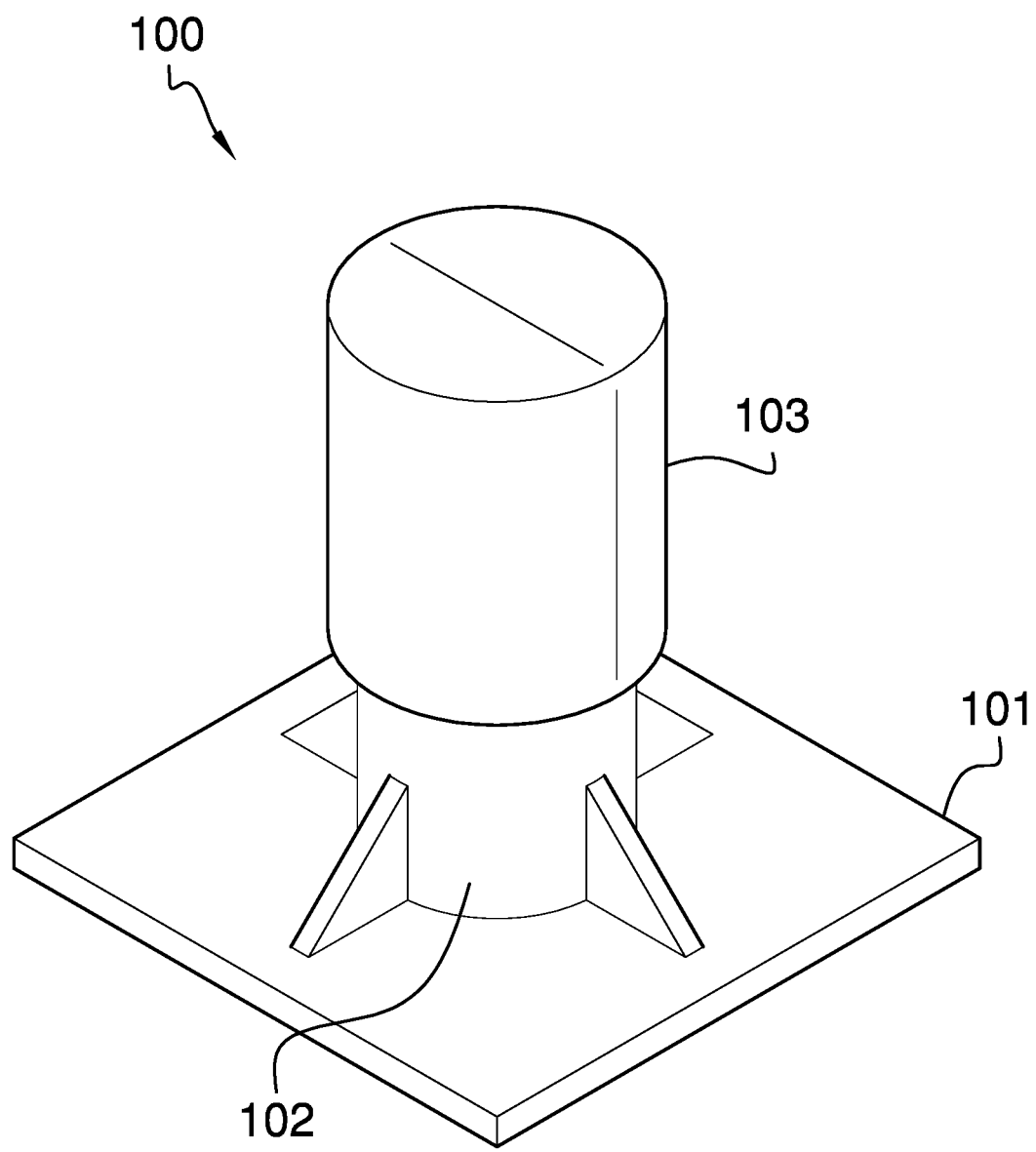
FIG. 1 is a perspective view of an embodiment of the disclosure.
Figure 2:
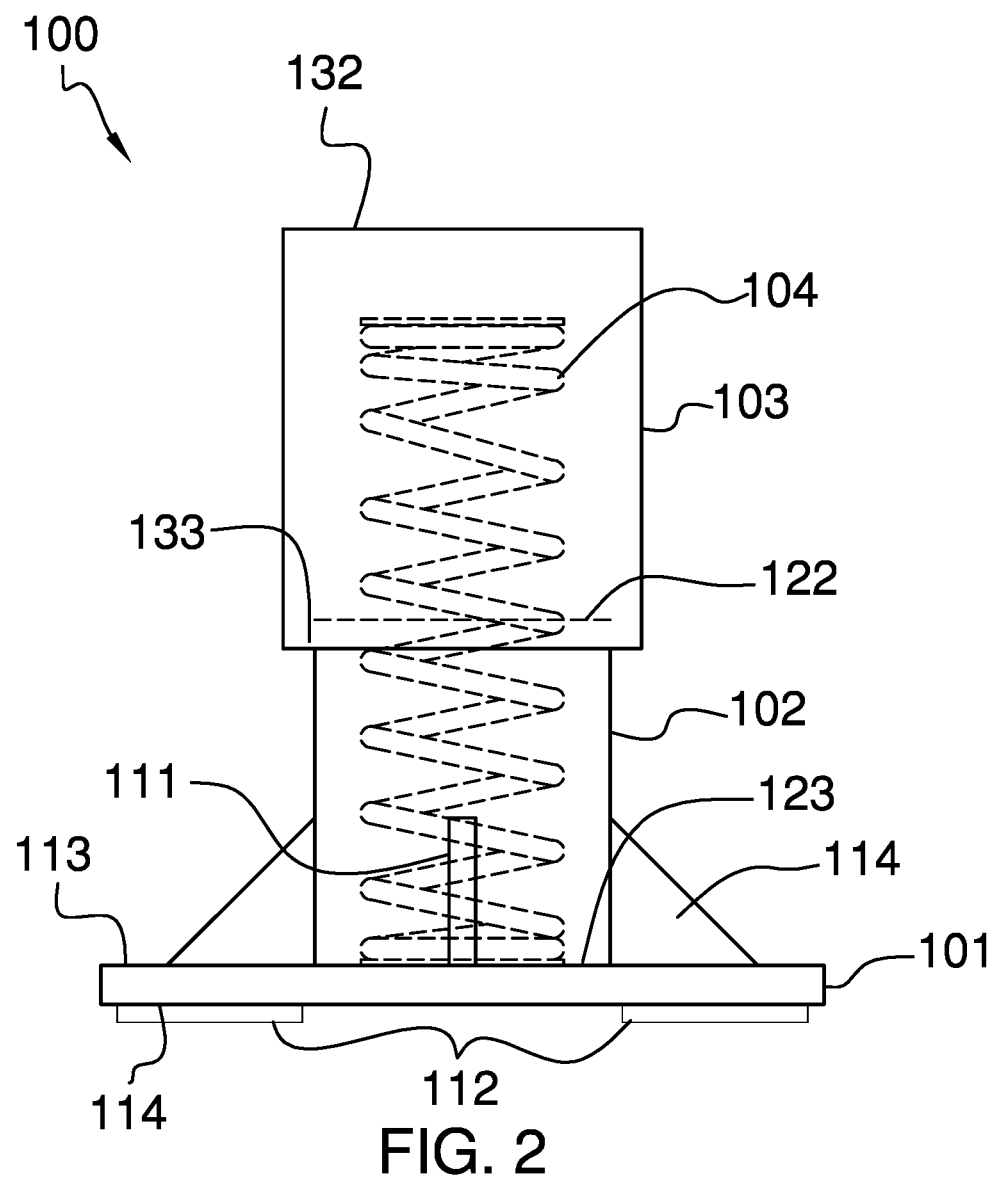
FIG. 2 is a front relaxed view of an embodiment of the disclosure.
Figure 3:
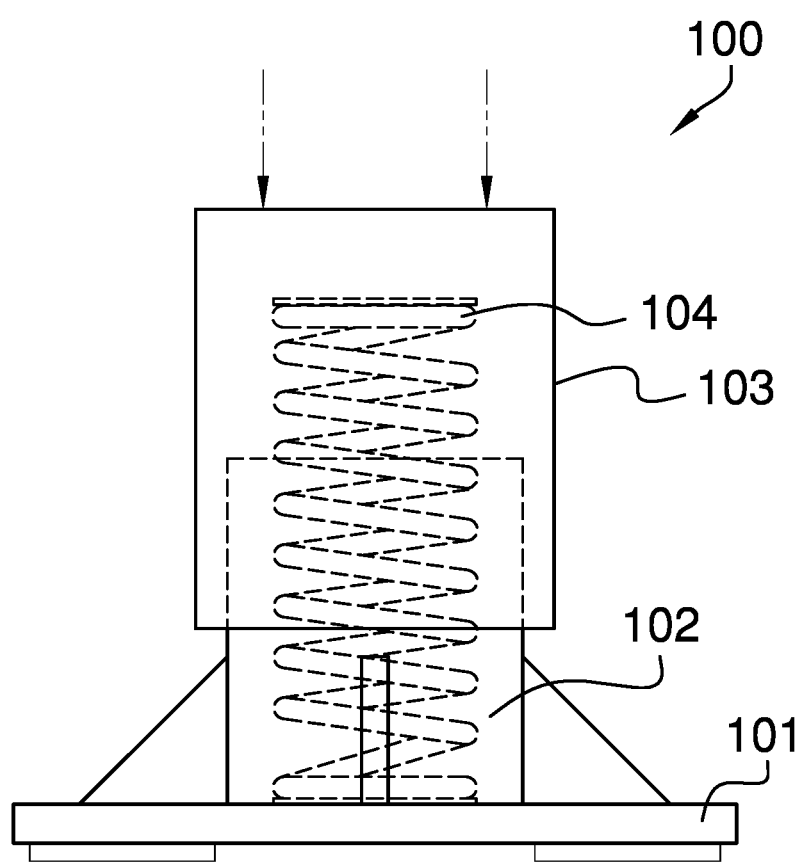
FIG. 3 is a front compressed view of an embodiment of the disclosure.
Figure 4:
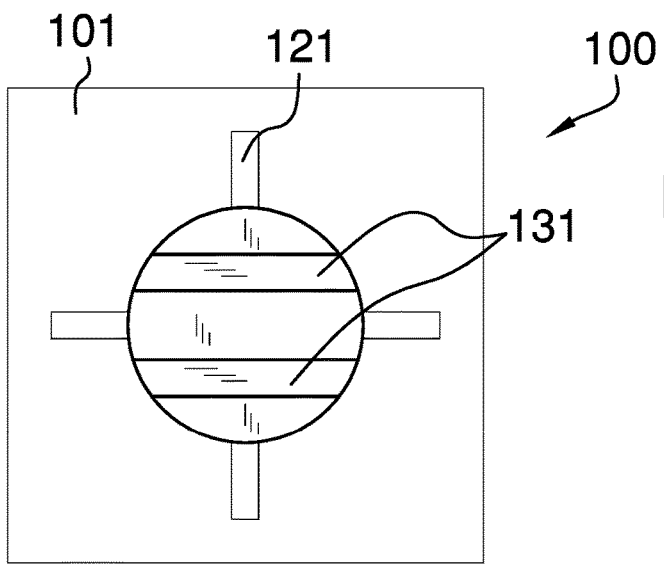
FIG. 4 is a top view of an embodiment of the disclosure.
Figure 5:
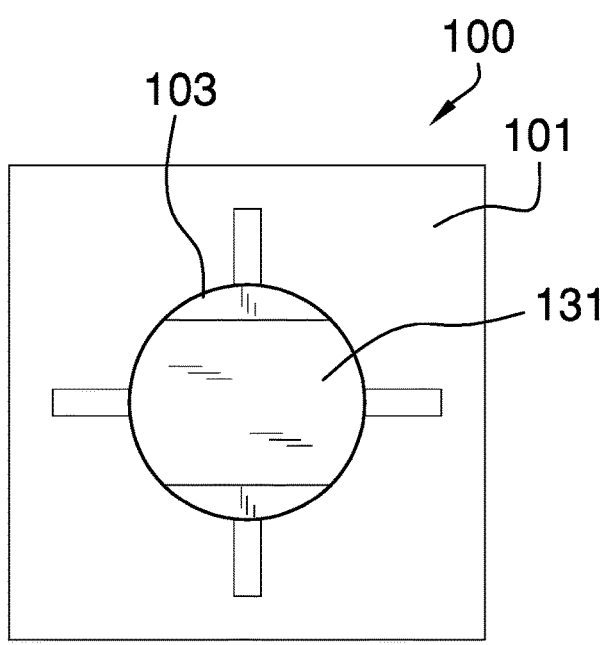
FIG. 5 is a top view of an alternate embodiment of the disclosure.
Figure 6:
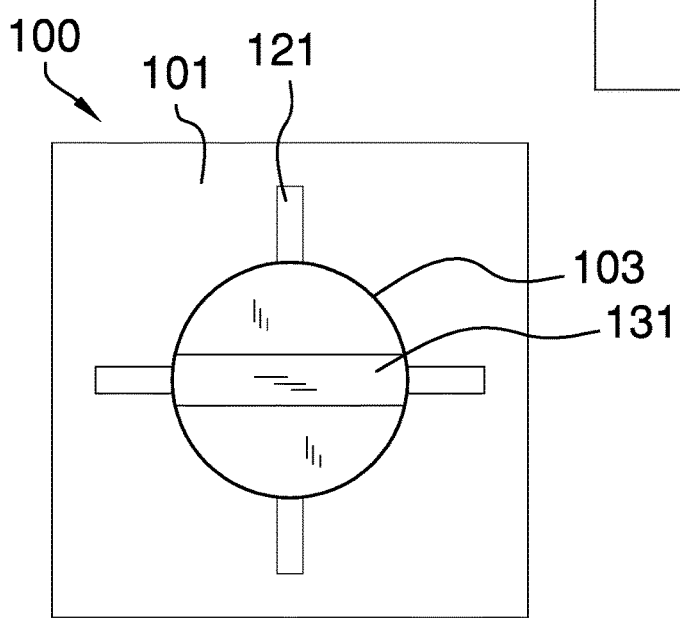
FIG. 6 is a top view of an alternate embodiment of the disclosure.
Figure 7:
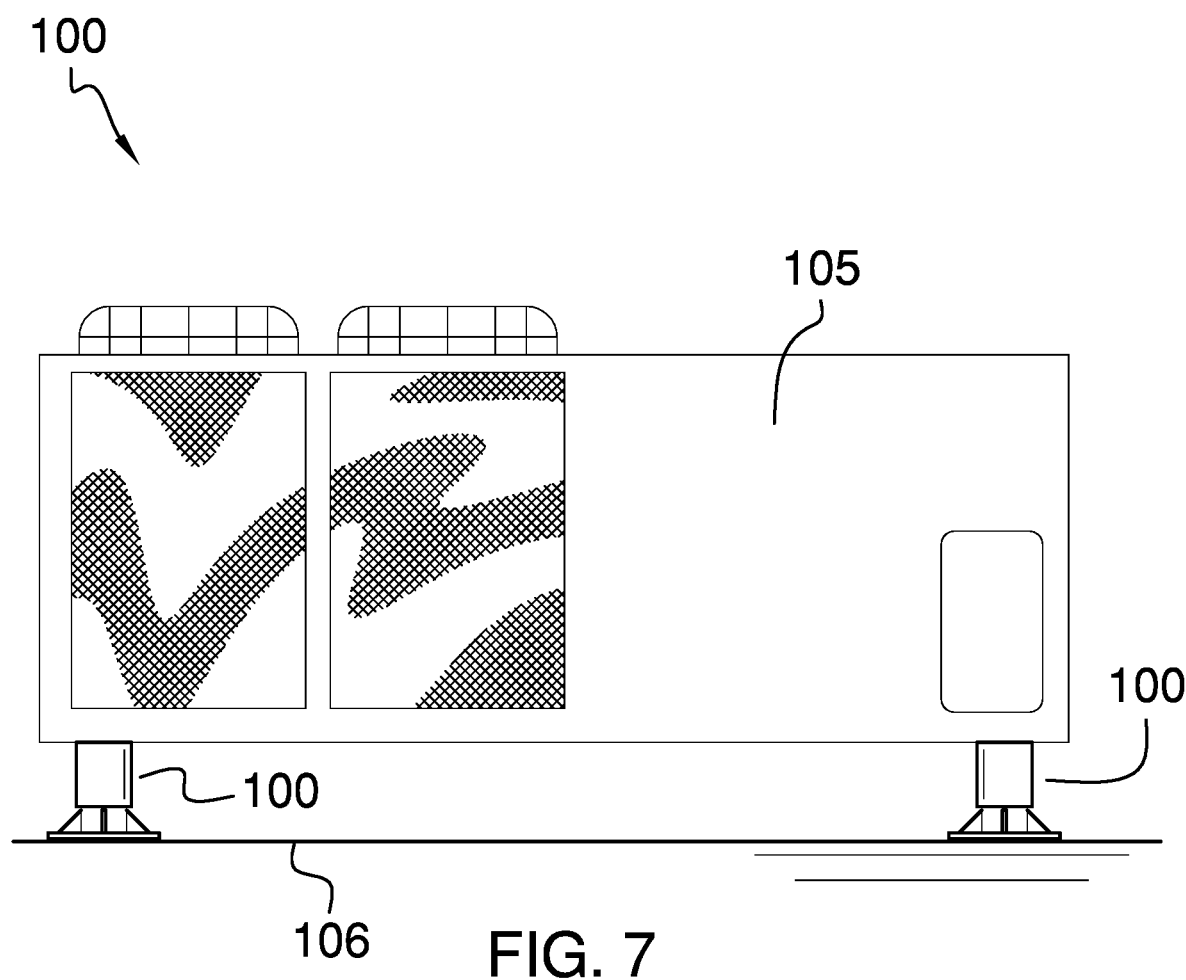
FIG. 7 is an in-use view of an embodiment of the disclosure.

Detailed reference will now be made to one or more potential embodiments of the disclosure, which are illustrated in FIGS. 1 through 7.

The vibration-dampening support for an HVAC unit 100 (hereinafter invention) is configured for use with heating, ventilation, and air conditioning (HVAC) equipment 105. The invention 100 is a pedestal structure that forms a load path that transfers the load of the HVAC equipment 105 to a supporting surface 106. The invention 100 is an elastic structure. The elastic nature of the invention 100 protects the HVAC equipment 105 by absorbing vibrations generated by the HVAC equipment 105. The invention 100 comprises a pedestal plate 101, a spring housing 102, a mounting tube 103, and a compression spring 104. The spring housing 102 contains the compression spring 104. The pedestal plate 101 and the mounting tube 103 attach to the spring housing 102.

The HVAC equipment 105 provides the motive forces required for the movement of atmospheric gases through an HVAC system. The HVAC is defined elsewhere in this disclosure. The supporting surface 106 is defined elsewhere in this disclosure.

The pedestal plate 101 is a prism structure. The pedestal plate 101 is a disk-shaped structure. The pedestal plate 101 forms a pedestal that forms the final link of the load path that transfers the load of the HVAC equipment 105 to the supporting surface 106. The pedestal plate 101 forms the inferior structure of the invention 100.

The pedestal plate 101 further comprises a superior face 113 and an inferior face 114. The superior face 113 is a congruent end of the disk structure of the pedestal plate 101. The superior face 113 is the congruent end of the superior face 113 that is distal from the supporting surface 106. The inferior face 114 is a congruent end of the disk structure of the pedestal plate 101. The inferior face 114 is the congruent end of the inferior face 114 that is proximal to the supporting surface 106. The inferior face 114 is the face of the pedestal plate 101 that is distal from the superior face 113.

The pedestal plate 101 comprises a centering post 111 and a plurality of footings 112.

The centering post 111 is a prism structure. The centering post 111 attaches to the superior face 113 of the pedestal plate 101. The centering post 111 attaches to the pedestal plate 101 such that the center axis of the prism structure of the centering post 111 projects perpendicularly away from the superior face 113 of the pedestal plate 101. The centering post 111 attaches to the pedestal plate 101 such that the center axis of the prism structure of the centering post 111 aligns with the center of the pedestal plate 101. The position of the centering post 111 within the spring housing 102 is such that the center axis of the centering post 111 aligns with the center axis of the spring housing 102. The centering post 111 forms a barrier that prevents the compression spring 104 from shifting position within the spring housing 102.

Each of the plurality of footings 112 are mechanical structures attached to the inferior face 114 of the pedestal plate 101. The plurality of footings 112 are used to level the superior face 113 of the pedestal plate 101 relative to the force of gravity. The plurality of footings 112 are used to balance the transfer of the load of the HVAC equipment 105 to the supporting surface 106.

The spring housing 102 is a prism structure. The spring housing 102 has a tube structure. The spring housing 102 forms a containment structure that contains the compression spring 104 within the invention 100. The inner diameter of the spring housing 102 is greater than the outer diameter of the compression spring 104 such that the compression spring 104 inserts into the spring housing 102. The spring housing 102 attaches to the superior face 113 of the pedestal plate 101. The spring housing 102 attaches to the pedestal plate 101 such that the center axis of the prism structure of the spring housing 102 projects perpendicularly away from the superior face 113 of the pedestal plate 101. The spring housing 102 attaches to the pedestal plate 101 such that the center axis of the prism structure of the spring housing 102 aligns with the center of the pedestal plate 101. The spring housing 102 permanently attaches to the pedestal plate 101.

The spring housing 102 further comprises a superior end 122 and an inferior end 123. The superior end 122 is a congruent end of the disk structure of the spring housing 102. The inferior end 123 of the spring housing 102 is the congruent end of the spring housing 102 that attaches to the superior face 113 of the pedestal plate 101. The superior end 122 is the congruent end of the spring housing 102 that is distal from the pedestal plate 101. The compression spring 104 inserts into the spring housing 102 through the superior end 122. The mounting tube 103 encloses the superior end 122 of the spring housing 102 when mounted on the spring housing 102.

The spring housing 102 further comprises a plurality of bracing disks 121. Each of the plurality of bracing disks 121 is a disk-shaped structure. The disk structure of each of the plurality of bracing disks 121 has the shape of a right triangle. Each of the plurality of bracing disks 121 attaches to the superior face 113 of the pedestal plate 101 such that the congruent ends of the disk structure of each of the plurality of bracing disks 121 is perpendicular to the superior face 113 of the pedestal plate 101.

The first leg of the right triangle shape of each of the plurality of bracing disks 121 attaches to the exterior lateral face of the prism structure of the spring housing 102 such that the first leg of the right triangle shape of each of the plurality of bracing disks 121 is parallel to the center axis of the spring housing 102. The second leg of the right triangle shape of each of the plurality of bracing disks 121 attaches to the superior face 113 of the pedestal plate 101 such that the second leg of the right triangle shape of each of the plurality of bracing disks 121 is perpendicular to the center axis of the spring housing 102. The second leg of the right triangle shape of each of the plurality of bracing disks 121 attaches to the superior face 113 of the pedestal plate 101 such that the second leg of the right triangle shape of each of the plurality of bracing disks 121 aligns radially with the center axis of the spring housing 102.

The mounting tube 103 is a prism structure. The mounting tube 103 has a capped tube structure. The inner diameter of the mounting tube 103 is greater than the outer diameter of the spring housing 102 such that the spring housing 102 inserts into the mounting tube 103 to form a composite prism structure. The mounting tube 103 secures the HVAC equipment 105 to the invention 100. The mounting tube 103 slides over the spring housing 102 such that the compression spring 104 elevates the open end 133 of the mounting tube 103 above the superior face 113 of the pedestal plate 101.

The mounting tube 103 further comprises a closed end 132 and an open end 133. The closed end 132 is the closed end 132 of the capped tube structure of the mounting tube 103. The open end 133 is the open end 133 of the capped tube structure of the mounting tube 103. The compression spring 104 and the spring housing 102 insert into the mounting tube 103 through the open end 133.

The mounting tube 103 further comprises one or more splines 131. Each of the one or more splines 131 is a negative space that is formed on the exterior surface of the closed end 132 of the mounting tube 103. Each of the one or more splines 131 is sized to receive a mounting structure of the HVAC equipment 105. Each of the one or more splines 131 secures the HVAC equipment 105 to the mounting tube 103.

The compression spring 104 is a mechanical device. The compression spring 104 forms the elastic structure of the invention 100. The compression spring 104 is an energy storage device. In the first potential embodiment of the disclosure, the compression spring 104 is a helical spring. The compression spring 104 inserts in the spring housing 102. The mounting tube 103 rests upon the compression spring 104. The compression spring 104 elevates the mounting tube 103 above the pedestal plate 101.

The compression spring 104 forms the section of the load path formed by the invention 100 that receives a portion of the load of the HVAC equipment 105 from the mounting tube 103 and transfers the received load to the pedestal plate 101. The energy storage capability of the compression spring 104 absorbs and diffuses the vibrational energies generated by the HVAC equipment 105 such that the HVAC equipment 105 remains stable during the operation of the HVAC equipment 105. The span of the length of the center axis of the helical structure of the compression spring 104 is greater than the span of the length of the center axis of the prism structure of the spring housing 102 such that the compression spring 104 extends beyond the superior end 122 of the spring housing 102.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Compress: In this disclosure, compress means to force into a smaller space.

Compression Spring: As used in this disclosure, a compression spring is a spring that resists forces attempting to compress the spring in the direction of the center axis of the spring. The compression spring will return to its relaxed shape when the compressive force is removed.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Dampening: As used in this disclosure, dampening refers to a structure that: a) reduces the tendency of an object or system to vibrate or oscillate; or, b) reduces the sensitivity of an object or system to impulses.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter. Include Radial Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Equilibrium: As used in this disclosure, equilibrium refers to an object or system that is subjected to no net force.

Footing: As used in this disclosure, a footing refers to one of a plurality of small pedestals that combine to: a) raise an object above a supporting surface; and, b) transfer the load path of the object to the supporting surface.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Helical Spring: As used in this disclosure, a helical spring is a compression spring shaped in the form of a cylindrical helix.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

HVAC: As used in this disclosure, HVAC is an acronym for Heating Ventilation and Air Conditioning and is a general term that refers to the air handling technology used within buildings.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interval: As used in this disclosure, the term interval refers to a period of time between a first event and a second event. The term regular interval is used to mean that the period of time between the first event and the second event remains constant. This disclosure assumes that the selected second event can be a repetition of the first event.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Pedestal: As used in this disclosure, a pedestal is an intermediary load bearing structure that that forms a load path between a supporting surface and an object, structure, or load.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Oscillation: As used in this disclosure, oscillation refers to a rhythmic variation of a measured physical parameter around a center value or a center position. The infinitive form of oscillation is to oscillate. An oscillation is often informally referred to as a vibration.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Perimeter: As used in this disclosure, a perimeter is one or more curved or straight lines that bounds an enclosed area on a plane or surface. The perimeter of a circle is commonly referred to as a circumference.

Plate: As used in this disclosure, a plate is a smooth, flat, and semi-rigid or rigid structure that has at least one dimension that: a) is of uniform thickness; and b) that appears thin relative to the other dimensions of the object. Plates often have a rectangular appearance. Plates often have a disk-like structure. The face of the plate is a surface of the plate selected from the group consisting of: a) the surface of the plate with the greatest surface area; b) the surface of the plate that is distal from the surface of the plate with the greatest surface area. The edges of the plate comprises the surfaces of the plate that would not be considered faces as defined above. As defined in this disclosure, plates may be made of any material, but are commonly made of metal, plastic, and wood. When made of wood, a plate is often referred to as a board or a plank.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Relaxed Shape: As used in this disclosure, a structure is considered to be in its relaxed state when no shear, strain, or torsional forces are being applied to the structure.

Rhythm: As used in this disclosure, a rhythm refers to a pattern that repeats at regular intervals.

Spline: As used in this disclosure, a spline is a prism-shaped negative space that is formed in an object. The spline receives, or guides the motion of, a second prism or disk-shaped object that inserts into the negative space formed by the spline.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Triangle: As used in this disclosure, a triangle is an enclosed geometric shape with a perimeter that is formed by three intersecting edges that form three vertices. The triangle is considered a polygon. The longest edge of the triangle is called the hypotenuse. The remaining two edges are called the legs of the triangle. If the measure of the interior angle with the largest arc formed by the triangle is greater than 90 degrees, then the triangle is called an obtuse triangle. If the measure of the interior angle with the largest arc formed by the triangle equals 90 degrees, then the triangle is called a right triangle. If the measure of the interior angle with the largest arc formed by the triangle is lesser than 90 degrees, then the triangle is called an acute triangle. An equilateral triangle has three edges of equal length. An isosceles triangle has two edges (the legs) of equal length. A scalene triangle has edges of three different lengths.

Tube: As used in this disclosure, the term tube is used to describe a rigid hollow prism-shaped device with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vibration: As used in this disclosure, vibration refers to one or more oscillations that are generated by a system that is not in equilibrium.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vibration dampening support comprising
a pedestal plate, a spring housing, a mounting tube, and a compression spring;
wherein the spring housing contains the compression spring;
wherein the pedestal plate and the mounting tube attach to the spring housing;
wherein the vibration dampening support is configured for use with heating, ventilation, and air conditioning (HVAC) equipment;
wherein the vibration dampening support is a pedestal structure that forms a load path that transfers the load of the HVAC equipment to a supporting surface;
wherein the vibration dampening support is an elastic structure;
wherein the elastic nature of the vibration dampening support protects the HVAC equipment by absorbing vibrations generated by the HVAC equipment;
wherein the pedestal plate further comprises a superior face and an inferior face;
wherein the spring housing attaches to the superior face of the pedestal plate;
wherein the spring housing attaches to the pedestal plate such that a center axis of the prism structure of the spring housing projects perpendicularly away from the superior face of the pedestal plate;
wherein the spring housing attaches to the pedestal plate such that the center axis of the prism structure of the spring housing aligns with a center of the pedestal plate;
wherein the spring housing further comprises a superior end and an inferior end;
wherein the superior end is a congruent end of the disk structure of the spring housing;
wherein the inferior end of the spring housing is the congruent end of the spring housing that attaches to the superior face of the pedestal plate;
wherein the superior end is the congruent end of the spring housing that is distal from the pedestal plate;
wherein the compression spring inserts into the spring housing through the superior end;
wherein the mounting tube encloses the superior end of the spring housing when mounted on the spring housing.

2. The vibration dampening support according to claim 1
wherein the pedestal plate is a disk-shaped structure;
wherein the pedestal plate forms a pedestal that forms the final link of the load path that transfers the load of the HVAC equipment to the supporting surface;
wherein the pedestal plate forms the inferior structure of the vibration dampening support.

3. The vibration dampening support according to claim 2
wherein the spring housing is a prism structure;
wherein the spring housing has a tube structure;
wherein the spring housing forms a containment structure that contains the compression spring within the vibration dampening support;
wherein the inner diameter of the spring housing is greater than the outer diameter of the compression spring such that the compression spring inserts into the spring housing;
wherein the spring housing permanently attaches to the pedestal plate.

4. The vibration dampening support according to claim 3
wherein the mounting tube is a prism structure;
wherein the mounting tube has a capped tube structure;
wherein the mounting tube secures the HVAC equipment to the vibration dampening support.

5. The vibration dampening support according to claim 4
wherein the compression spring is a mechanical device;
wherein the compression spring forms the elastic structure of the vibration dampening support;
wherein the compression spring is an energy storage device.

6. The vibration dampening support according to claim 5
wherein the compression spring is a helical spring;

wherein the compression spring inserts in the spring housing;

wherein the mounting tube rests upon the compression spring;

wherein the compression spring elevates the mounting tube above the pedestal plate;

wherein the compression spring forms the section of the load path formed by the vibration dampening support that receives a portion of the load of the HVAC equipment from the mounting tube and transfers the received load to the pedestal plate;

wherein the energy storage capability of the compression spring absorbs and diffuses the vibrational energies generated by the HVAC equipment such that the HVAC equipment remains stable during the operation of the HVAC equipment.

7. The vibration dampening support according to claim 6 wherein the superior face is a congruent end of the disk structure of the pedestal plate;

wherein the superior face is the congruent end of the superior face that is distal from the supporting surface;

wherein the inferior face is a congruent end of the disk structure of the pedestal plate;

wherein the inferior face is the congruent end of the inferior face that is proximal to the supporting surface;

wherein the inferior face is the face of the pedestal plate that is distal from the superior face.

8. The vibration dampening support according to claim 7 wherein the inner diameter of the mounting tube is greater than the outer diameter of the spring housing such that the spring housing inserts into the mounting tube to form a composite prism structure;

wherein the mounting tube slides over the spring housing such that the compression spring elevates the open end of the mounting tube above the superior face of the pedestal plate.

9. The vibration dampening support according to claim 8 wherein the mounting tube further comprises a closed end and an open end;

wherein the closed end is the closed end of the capped tube structure of the mounting tube;

wherein the open end is the open end of the capped tube structure of the mounting tube;

wherein the compression spring and the spring housing insert into the mounting tube through the open end.

10. The vibration dampening support according to claim 9 wherein the pedestal plate comprises a centering post and a plurality of footings;

wherein the centering post attaches to the superior face of the pedestal plate;

wherein each of the plurality of footings are mechanical structures attached to the inferior face of the pedestal plate.

11. The vibration dampening support according to claim 10 wherein the spring housing further comprises a plurality of bracing disks;

wherein each of the plurality of bracing disks is a disk-shaped structure;

wherein the disk structure of each of the plurality of bracing disks has the shape of a right triangle.

12. The vibration dampening support according to claim 11 wherein the mounting tube further comprises one or more splines;

wherein each of the one or more splines is a negative space that is formed on the exterior surface of the closed end of the mounting tube.

13. The vibration dampening support according to claim 12 wherein the centering post is a prism structure;

wherein the centering post attaches to the pedestal plate such that the center axis of the prism structure of the centering post projects perpendicularly away from the superior face of the pedestal plate;

wherein the centering post attaches to the pedestal plate such that the center axis of the prism structure of the centering post aligns with the center of the pedestal plate;

wherein the position of the centering post within the spring housing is such that the center axis of the centering post aligns with the center axis of the spring housing;

wherein the centering post forms a barrier that prevents the compression spring from shifting position within the spring housing.

14. The vibration dampening support according to claim 13 wherein the plurality of footings level the superior face of the pedestal plate relative to the force of gravity;

wherein the plurality of footings balance the transfer of the load of the HVAC equipment to the supporting surface.

15. The vibration dampening support according to claim 14 wherein each of the plurality of bracing disks attaches to the superior face of the pedestal plate such that the congruent ends of the disk structure of each of the plurality of bracing disks is perpendicular to the superior face of the pedestal plate.

16. The vibration dampening support according to claim 15 wherein the first leg of the right triangle shape of each of the plurality of bracing disks attaches to the exterior lateral face of the prism structure of the spring housing such that the first leg of the right triangle shape of each of the plurality of bracing disks is parallel to the center axis of the spring housing;

wherein the second leg of the right triangle shape of each of the plurality of bracing disks attaches to the superior face of the pedestal plate such that the second leg of the right triangle shape of each of the plurality of bracing disks is perpendicular to the center axis of the spring housing;

wherein the second leg of the right triangle shape of each of the plurality of bracing disks attaches to the superior face of the pedestal plate such that the second leg of the right triangle shape of each of the plurality of bracing disks aligns radially with the center axis of the spring housing.

17. The vibration dampening support according to claim 16 wherein each of the one or more splines is sized to receive a mounting structure of the HVAC equipment;

wherein each of the one or more splines secures the HVAC equipment to the mounting tube.

18. The vibration dampening support according to claim 17 wherein the span of the length of the center axis of the helical structure of the compression spring is greater than the span of the length of the center axis of the prism structure of the spring housing such that the compression spring extends beyond the superior end of the spring housing.

\* \* \* \* \*